No. 735,753. PATENTED AUG. 11, 1903.
H. H. GOVE.
DEVICE FOR PATCHING RUBBER BOOTS, &c.
APPLICATION FILED JUNE 19, 1902.
NO MODEL.
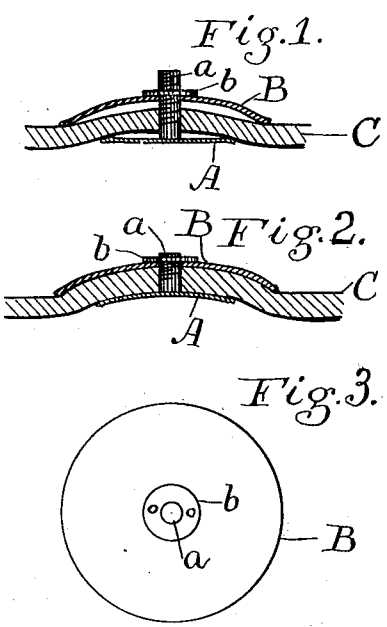

No. 735,753. Patented August 11, 1903.

UNITED STATES PATENT OFFICE.

HENRY H. GOVE, OF BIDDEFORD, MAINE.

DEVICE FOR PATCHING RUBBER BOOTS, &c.

SPECIFICATION forming part of Letters Patent No. 735,753, dated August 11, 1903.

Application filed June 19, 1902. Serial No. 112,276. (No model.)

*To all whom it may concern:*

Be it known that I, HENRY H. GOVE, a citizen of the United States of America, and a resident of Biddeford, York county, State of Maine, have invented certain new and useful Improvements in Devices for Patching Rubber Boots, &c., of which the following is a specification.

My invention relates to a device for stopping holes or leaks in rubber articles, and it is particularly designed for use on rubber boots, lumber-men's rubbers, and the like.

It is a well-known fact that it is a difficult thing to apply a patch to a rubber boot so that it will remain firmly in place without peeling off, and it is to remedy this difficulty and to provide an efficient device which anybody can easily and quickly apply for the purpose of patching or stopping leaks in rubber articles that is the object of my invention.

The invention consists of the combination of parts hereinafter shown and claimed.

I illustrate my invention by means of the accompanying drawings, in which—

Figure 1 is a vertical section taken through my device, showing it in place applied to the rubber article and partially closed up. Fig. 2 shows the same with the flat head and washer clamped together as it is finally applied, and Fig. 3 is a plan of the same.

The screw or bolt $a$ is provided with a relatively large thin flat head, made flexible or yielding, so as to conform to the recess on the inner side of the washer B, which is made concave in form, the concave portion coming next to the outer surface of the rubber. The washer B is larger in diameter than the head A, so that when the latter is drawn up it draws the intervening thickness of rubber into the recess in the under side of the washer and leaves the inside of the boot free from any projection to interfere with the use of the boot. This is very important, since the slightest projection on the inside of the boot would chafe the foot and render the boot useless.

In applying the device the screw or bolt is passed through the hole, with the flat head inside of the boot. The washer is then placed on over the bolt and the nut $b$ screwed on, drawing the two plates together, after which the bolt is cut off as short as possible.

These patches or mending devices may be made of any desired material; but I prefer to stamp them out of thin steel, finishing them with japan. They may be of any desired shape to fit different kinds of holes, and they may have a plurality of bolts in one head, if desired, to mend long tears and the like.

The device is quickly and easily applied and forms an absolutely tight joint. If desired, a coating of cement may be applied inside the washer or head, although this is not necessary, as the joint is perfectly tight without it.

The head instead of being integral with the bolt, as here shown, may be formed of a separate piece in the ordinary manner.

I claim—

The herein-described device for stopping leaks in rubber boots, &c., consisting of a screw having a relatively large and thin yielding head adapted to be applied to the inner surface of the boot, a concave washer fitting over said screw and of larger diameter than said head and a nut on said screw adapted to draw said yielding head into the concave portion of the washer.

Signed at Portland, Maine, this 14th day of June, 1902.

HENRY H. GOVE.

Witnesses:
S. W. BATES,
BENJ. G. WARD.